United States Patent
Holding et al.

(10) Patent No.: US 10,895,309 B2
(45) Date of Patent: Jan. 19, 2021

(54) SCREW SEAL AND LUBRICATION

(71) Applicant: Goodrich Actuation Systems Limited, Solihull (GB)

(72) Inventors: James Holding, Cannock (GB); Andrew Hawksworth, Moreton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 147 days.

(21) Appl. No.: 16/059,497

(22) Filed: Aug. 9, 2018

(65) Prior Publication Data
US 2019/0063571 A1    Feb. 28, 2019

(30) Foreign Application Priority Data
Aug. 25, 2017    (EP) .................................... 17187984

(51) Int. Cl.
| F16H 25/24 | (2006.01) |
| F16H 57/04 | (2010.01) |
| F16H 25/22 | (2006.01) |
| F16J 15/32 | (2016.01) |
| F16J 15/324 | (2016.01) |

(52) U.S. Cl.
CPC ..... F16H 25/2418 (2013.01); F16H 25/2204 (2013.01); F16H 57/0497 (2013.01); F16J 15/32 (2013.01); F16J 15/324 (2013.01)

(58) Field of Classification Search
CPC ...... F16J 15/32; F16J 15/324; F16H 25/2418; F16H 25/2204; F16H 57/0497
See application file for complete search history.

(56) References Cited

U.S. PATENT DOCUMENTS

| 3,646,827 | A | * | 3/1972 | Patterson | ............ F16H 25/2418 74/89.4 |
| 4,905,533 | A | * | 3/1990 | Benton | ............... F16H 25/2418 277/354 |
| 5,555,771 | A | * | 9/1996 | Kuroiwa | ............... F16B 19/004 277/354 |
| 5,722,294 | A | * | 3/1998 | Kobayashi | ......... F16H 25/2418 277/500 |
| 6,450,295 | B1 | * | 9/2002 | Tsukada | ............ F16H 25/2418 184/5 |
| 6,571,653 | B1 | * | 6/2003 | Takeda | ................ F16H 57/0497 74/89.4 |
| 7,946,018 | B2 | | 5/2011 | Tokura et al. | |
| 9,388,890 | B2 | | 7/2016 | Garrett et al. | |
| 9,488,255 | B2 | | 11/2016 | Ishizaki et al. | |

(Continued)

FOREIGN PATENT DOCUMENTS

| EP | 3059470 A1 | 8/2016 |
| JP | 2003120783 A | 4/2003 |
| JP | 2003083418 A | 3/2013 |

OTHER PUBLICATIONS

Extended European Search Report for International Application No. 17187984.4 dated Feb. 8, 2018, 9 pages.

*Primary Examiner* — Gilbert Y Lee
(74) *Attorney, Agent, or Firm* — Cantor Colburn LLP (57) ABSTRACT

Disclosed herein is a screw assembly comprising an internal re-circulating path for re-circulating lubricant fluid between a threaded screw shaft and seals provided at the ends of the screw assembly via internal chambers provided within the seals and passages formed within the nut. Also disclosed are seals for use within such assemblies.

7 Claims, 6 Drawing Sheets

(56) References Cited

U.S. PATENT DOCUMENTS

| | | |
|---|---|---|
| 2001/0010176 A1 | 8/2001 | Tsukada et al. |
| 2002/0062705 A1* | 5/2002 | Michioka ............ F16H 25/2418 74/424.82 |
| 2010/0236346 A1 | 9/2010 | Osterlaenger et al. |
| 2016/0298757 A1* | 10/2016 | Miyazaki ............ F16H 25/2418 |
| 2017/0002680 A1 | 1/2017 | Tonaka et al. |

* cited by examiner

Motion of inner screw thread relative to outer screw thread

SCREW SEAL AND LUBRICATION

FOREIGN PRIORITY

This application claims priority to European Patent Application No. 17187984.4 filed Aug. 25, 2017, the entire contents of which is incorporated herein by reference.

TECHNICAL FIELD

The present disclosure relates generally to seals, and particularly to seals for use with screw assemblies.

BACKGROUND

A screw actuator is a mechanical linear actuator that generally acts to convert rotational movement into linear movement. One example of a screw actuator is a ballscrew which typically comprises a threaded shaft which provides a helical raceway for ball bearings which act as a precision screw. The nature of this mechanism inherently requires good lubrication between the ball bearings and the shaft for providing better ballscrew performance and endurance.

Lubrication of screw actuators such as ballscrews is typically achieved by use of a lubricant such as grease. For most applications, the lubricant must generally be somehow contained within the screw assembly in order to maintain a sufficient level of lubrication. Thus, a seal may be provided for this purpose. However, the helical nature of the screw shaft makes it difficult to adequately contain the lubricant using existing sealing techniques and the migration of the lubricant material causes the lubricant to be lost over time. Thus, there is a need for existing screw actuator assemblies to be regularly maintained by the re-introduction of lubricant material.

Some examples of existing ballscrew assemblies are described in US 2010/023636 (INA-SCHAEFFLER KG), U.S. Pat. No. 7,946,018 (NSK Ltd.), US 2017/0002680 (MITSUBISHI) and U.S. Pat. No. 9,488,255 (NITTA CORPORATION).

Screw actuators are utilised in many industries. For instance, screw actuators, and particularly ballscrew assemblies, are increasingly found in aircraft especially with the trend in the aerospace industry towards electric drive systems. The requirement for periodic re-lubrication is especially of concern for aerospace applications where it is generally desired to keep maintenance (i.e. non-operational) time to a minimum.

SUMMARY

From a first aspect of the present disclosure there is provided a seal for a screw assembly comprising: a seal body having an inner surface for mounting onto and sealing against a screw shaft; an internal chamber formed within the seal body, wherein one or more openings are provided on the inner surface to allow lubricant material to transfer between the inner surface and the internal chamber; and one or more external ports provided on an external surface (e.g. a radial surface and/or an outer surface of said seal body) for transferring lubricant material into or out of said internal chamber of said seal body.

The inner surface of the seal body may generally surround or define a central bore suitably shaped and sized for receiving a screw shaft. For example, the seal body may generally comprise a substantially annular seal body. Thus, the seal may be installed onto a screw shaft by mounting the seal body around the shaft such that the inner surface sealingly engages with the shaft. It will be understood therefore that the inner surface is generally the surface that faces radially inwardly, i.e. the surface that in use engages against the screw shaft.

The inner surface of the seal body is provided with a series of openings allowing for fluid communication between the inner surface of the seal body (which in use may engage with a screw shaft) and an internal chamber formed within the seal body. Thus, lubricant material may be transferred between the inner surface of the seal body and the internal chamber via the openings. It is contemplated that the openings may also open out onto a radial surface of the seal body (i.e. a surface extending in the radial direction, perpendicular to the axis of a screw shaft upon when installed) in order to allow fluid to be transferred from other non-exposed parts of the screw shaft, such as the outermost diameter, into the internal chamber.

A series of external ports are also provided for transferring fluid from the internal chamber out of the seal body (or vice versa), and particularly for transferring fluid from the internal chamber away from the inner surface. The external ports may thus be provided in a radial surface of the seal body (i.e. a surface extending in the radial direction perpendicular to the axis of the screw shaft when installed). Alternatively, or additionally, the external ports may be provided in a radially outer surface of the seal body (i.e. a surface generally facing radially outwardly, e.g. in a direction away from the inner surface). In other words, the external ports may generally be provided in an external surface of the seal body so as to define a fluid transfer path for transferring fluid from the internal chamber away from the inner surface (so that the fluid is transferred radially outwards away from the inner surface, and/or in an orthogonal direction, depending on the location and orientation of the external ports).

Thus, a fluid transfer path is defined within the seal body allowing fluid (e.g. lubricant material) to be transferred into the seal body through the openings provided on the inner surface of the seal body, into the internal chamber, and then out of the external ports (or into the external ports, into the internal chamber and then out the openings provided on the inner surface).

The one or more openings may generally have a shape which is designed or chosen to facilitate transfer of fluid around the seal body in a desired direction. The one or more openings typically comprise cut-out portions of the inner surface. The cut-out portions may generally be tapered towards an orifice open to the internal chamber. Thus, the edges and/or internal faces of the cut-out portions may be arranged and/or designed so as to facilitate transfer of fluid around the seal body in a desired direction.

For instance, the one or more openings may be shaped so that when the seal is installed onto a screw shaft, a rotation of the shaft relative to the seal body in a first direction causes lubricant material to move from the shaft into the internal chamber. The one or more openings may further be shaped so that a rotation of the shaft relative to the seal body in a second, opposite direction causes lubricant material to move from said internal chamber onto said shaft.

For example, the one or more openings may or may each comprise a first portion (or edge) that is generally designed to facilitate the lifting of lubricant material into the internal chamber upon rotation of the shaft in a first direction. In embodiments, the first portion (or edge) may extend substantially or approximately perpendicularly to the inner surface of the seal body. Thus, upon rotation of the shaft towards the first portion (a rotation in a first direction), the lubricant material may be caused to accrete against the first portion and lift up from the shaft into the internal chamber. However, it will be appreciated that the first portion may take various suitable forms whilst still functioning to lift lubricant material from the shaft into the internal chamber upon relative rotation in a first direction. For instance, and generally, the first portion may either be straight or curved (in either or both of the radial or lateral directions).

The one or more openings may or may each further comprise a second portion (or edge), generally positioned opposite to the first portion, and designed to facilitate the transfer of lubricant material out of the internal chamber and onto the inner surface so that when the seal is installed onto a screw shaft, a rotation of the shaft towards the second portion (i.e., in a second direction which is opposite to the first direction mentioned above, away from the first portion) causes lubricant material to spread from the internal chamber onto the shaft. For example, the second portion may extend at a relatively shallower angle to the inner surface than the first portion. The second portion may define a generally acute internal angle with the inner surface of the seal body. However, again, it will be appreciated that the form of the second portion may vary significantly whilst still functioning to transfer lubricant material from the internal chamber onto the shaft upon relative rotation in the second direction.

Thus, in some examples, each of the openings may comprise a substantially triangular or wedged shape in radial cross-section with two sides of the triangle being formed by the first portion (extending approximately perpendicular to the inner surface of the seal body) and the second portion (defining an acute angle with the inner surface of the seal body.

The openings may generally have a substantially fixed shape e.g. defined by the first and second portions. However, it is also contemplated that the openings may be variable so that the shape of the opening varies upon relative rotation between the seal body and a screw shaft onto which it is mounted. For instance, the openings may comprise one or more flexible or movable parts that allow the shape of the openings to vary as the inner surface of the seal body rotates relative to a shaft upon which the seal body is mounted.

The inner surface of the seal body may comprise a plurality of such openings (however they are formed) arranged circumferentially around said inner surface of said seal body. For example, the inner surface may comprise two, three, four, five, six or more openings. A plurality, or all, of the openings may open into a single internal chamber. However, other alternative arrangements are also contemplated. For instance, multiple internal chambers may be formed within the seal body, each having respective openings provided on the inner surface.

The inner surface of the seal body may generally be profiled to conform to a thread profile of a screw shaft onto which the seal is to be installed. That is, the inner surface may comprise a helical thread pattern substantially matching the thread profile of the screw shaft to allow the seal body to better seal against the screw shaft. It will be appreciated that the profile of the inner surface may generally be chosen to conform to the corresponding thread profile of any screw shaft onto which the seal is intended to be installed. For example, in embodiments, the inner surface may be profiled to conform to the thread profile of a corresponding ballscrew shaft. However, in other examples, the inner surface may be profiled to conform to the thread profile of a different screw shaft having a different thread profile.

A seal according to the present disclosure may suitably be formed by a soluble core manufacturing process. Alternatively, the seal may be formed by a process of moulding and subsequent machining.

From another aspect of the present disclosure there is provided a screw assembly comprising: a screw shaft having a helical thread profile; and a nut for mounting around the screw shaft; the screw assembly further comprising a first seal and a second seal, wherein each of the first seal and the second seal independently comprises a seal substantially of the type described herein in relation to the present disclosure; wherein respective external ports of the first and second seals are aligned with respective passages extending through the screw assembly to provide a re-circulating path for re-circulating lubricant material within the screw assembly.

Thus, a path for re-circulating fluid may be provided within the screw assembly so that lubricant material may be circulated and hence contained within the screw assembly. Thus, the passages that define (in part) the re-circulating path generally extend axially though the screw assembly and between the first and second seals. For instance, the passages may be substantially parallel to the screw shaft, at least along a significant part of their extent.

Each of the first and second seals may independently comprise a seal substantially of the type described above (e.g. comprising an internal chamber in fluid communication with an inner surface of the seal body with a series of openings provided on the inner surface and a plurality of external ports allowing fluid to be transferred into/out of the internal chamber away from the inner surface). The first and second seals may be of substantially the same type but with the first and second seals installed in the opposite sense to one another, i.e. so that the external ports of the first seal face towards the external ports of the second seal in order to define the re-circulating path for the lubricant material. However, it is also contemplated that the first and seals may be substantially different to one another.

The passages may be formed within the nut such that the re-circulating path extends from the first seal through the passage formed within the nut to the second seal. Thus, the lubricant material may flow from the first seal, through the passage to the second seal, and then along the shaft back to first seal (or vice versa). However, it will be appreciated that the passages need not be formed within the nut, and may for instance instead be formed in another, separate component disposed radially outwardly of the screw shaft.

The screw assembly may be substantially filled with lubricant material in (or before) use. The re-circulating path may thus provide a path of relatively low resistance for the lubricant material to flow during use, so that the lubricant material is generally contained within the re-circulating path.

Typically, the first seal is disposed at a first end of the screw assembly and the second seal disposed at a second, opposite end of the screw assembly. Thus, corresponding seal ports may be provided at each end of the screw assembly. However, it is also contemplated that seals may be provided at other positions within the screw assembly, or that third or further seals may also be provided, in order to define multiple independent re-circulating circuits within the screw assembly.

The screw assembly may be configured so that a rotation of the shaft relative to the first and second seals in a clockwise (first) direction causes lubricant material to flow around said re-circulating path in a first direction and wherein rotation of said shaft relative to the first and second seals in an anti-clockwise (second, opposite) direction causes lubricant material to flow around the re-circulating path in a second, opposite direction. The shapes of the openings provided on the respective inner surfaces of the first and second seals may thus be chosen to facilitate driving the lubricant material around the re-circulating path in this manner.

The screw assembly may comprise a ballscrew assembly. Thus, also provided is a ballscrew assembly comprising: a ballscrew shaft having a helical thread; a plurality of ball bearings received within the helical thread; and a ball nut for mounting around the shaft in order to radially confine the ball bearings within the ballscrew assembly. The ballscrew assembly may further comprise a first seal and a second seal, wherein each of the first and second seals may independently comprise a seal substantially of the type described above, and wherein respective external ports of the first and second seals are aligned with respective passages extending through said ballscrew assembly to provide a re-circulating path for re-circulating lubricant material within the ballscrew assembly. The ballscrew assembly may also comprise any other typical ballscrew assembly components. For instance, a ball re-circulating path may be provided for re-circulating the ball bearings around the ballscrew shaft.

The screw assemblies described herein may find application as part of a linear actuator, and particularly for use within an aircraft or an aircraft control system. However, it will be appreciated that the screw assemblies and linear actuators described herein may generally find application in any systems where it is desired to better contain lubricant material.

BRIEF DESCRIPTION OF THE DRAWINGS

Various arrangements and embodiments will now be described, by way of example only, and with reference to the accompanying drawings, in which.

DETAILED DESCRIPTION

Figure 1:
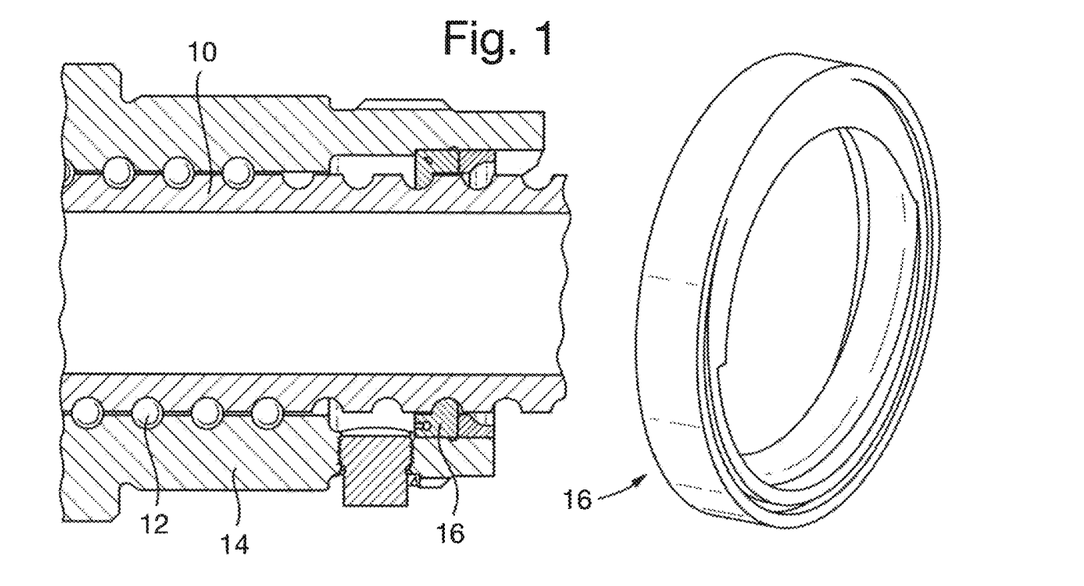
FIG. 1 shows an example of an existing ballscrew sealing mechanism.

FIG. 1 shows an example of a known sealing mechanism that may be used in some prior art screw assemblies. In particular, and by way of example, FIG. 1 shows a sealing mechanism for a ballscrew assembly. As shown, the ballscrew comprises a threaded shaft 10, a plurality of ball bearings 12 received within the helical profile of the shaft 10, and a ball nut 14 for containing the ball bearings 12 within the ballscrew. Lubricant material may be introduced between the ball bearings 12 and the shaft 10 prior to, or during, use of the ballscrew. Typically, the lubricant material comprises oil or grease or another suitable lubricating fluid.

The lubricant material tends to migrate around the helical profile of the shaft 10 in use, i.e. as the shaft rotates within the ballscrew assembly. In order to try to contain the lubricant material, a labyrinth seal 16 may be provided, as shown, having an internal profile that conforms to the helical or threaded outer profile of the shaft 10. However, such seals 16 may not be entirely effective at preventing the natural migration of the lubricant material out of the ballscrew assembly and lubricant material may still escape over time. Thus, the ballscrew assembly must regularly be re-lubricated, during which times the system within which the ballscrew assembly is installed (e.g. an aircraft) may be inoperational.

Thus, according to the present disclosure, a novel sealing design may be provided that offers a path for the lubricating material (e.g. fluid) to be re-directed and re-circulated within the ballscrew assembly via the seals. Thus, the natural migration of the lubricating material may be exploited by providing within the ballscrew assembly a path of lower (e.g. or least) resistance for the lubricant material so that the lubricant material may tend to circulate around the ballscrew assembly (rather than escape) and hence be better contained therein.

Figure 2:
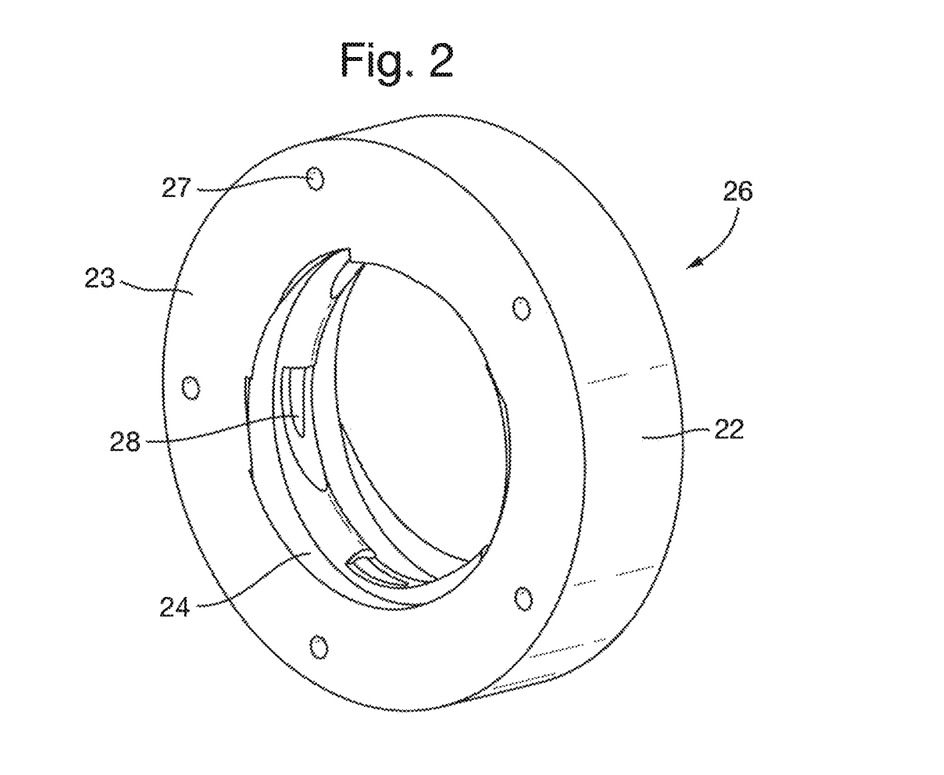
FIG. 2 shows a ballscrew seal according to an example of the present disclosure.
Figure 3:
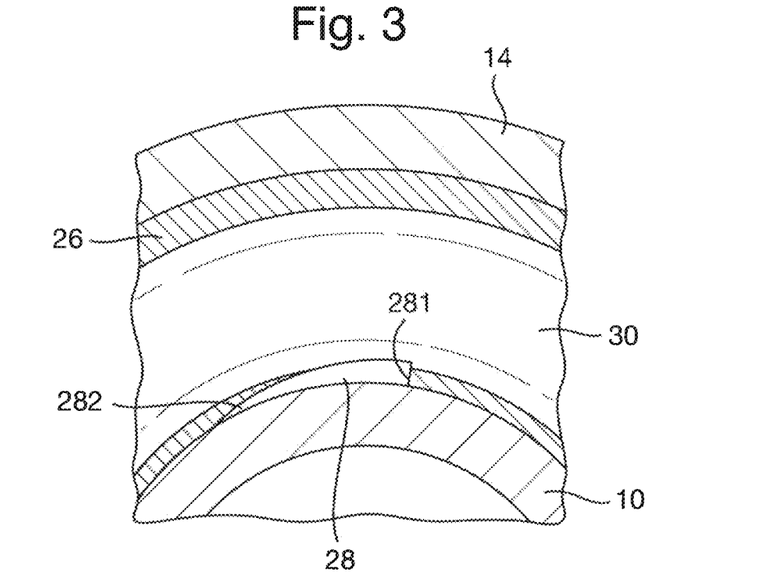
FIG. 3 shows a first sectional view of a seal as depicted in FIG. 2 installed on a ballscrew.

FIG. 2 shows an example of a ballscrew seal according to the present disclosure. The seal comprises a seal body 26 having an inner surface 24 defining a central bore for receiving a ballscrew shaft. Similarly to the existing seal 16 depicted in FIG. 1, the profile of the inner surface 24 of the seal 26 (or at least a portion thereof) generally conforms to the helical thread of a ballscrew shaft in order to provide a labyrinth seal for preventing loss of lubricant material by ingress between the helical thread of the shaft 10 and the seal body 26. However, according to embodiments of the present disclosure, the inner surface 24 of the seal 26 further comprises one or more, such as a series of, cut-out portions or openings 28 that open into an internal chamber 30 formed within the seal body 26. FIG. 3 is a sectional view of a seal of the type depicted in FIG. 2 installed onto a ballscrew shaft 10 between the shaft 10 and a ball nut 14 that best shows the interior chamber 30.

Figure 10:
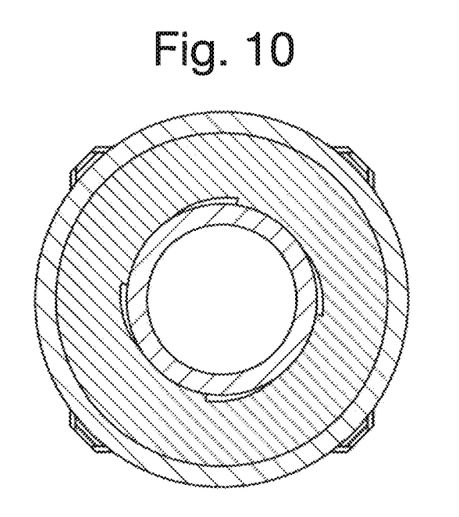
FIG. 10 shows an example of one alternative arrangement of openings around an inner surface of a seal of the type shown in FIG. 2.

It will be appreciated that the seal body 26 may generally comprise a single internal chamber 30 extending annularly around the seal body 26 (or extending annularly around at least a portion of the seal body 26), with the single internal chamber 30 being in fluid communication with each of the openings 28. However, it will also be appreciated that the seal body 26 may comprise a plurality of individual internal chambers 30, each individual chamber 30 being associated with a respective one or ones of a plurality of openings 28. The skilled person will appreciate that various suitable configurations of openings 28 and internal chambers 30 may be provided. For instance, the number and arrangement or spacing of the openings 28 arranged around the inner surface 24 of the seal 26 may take various suitable configurations other than that depicted in FIG. 2. For example, FIG. 10 shows another exemplary configuration having four equally spaced openings 28.

The openings 28 provided on the inner surface 24 of the seal body 26, however they are arranged, generally allow for fluid communication between the inner surface of the seal 26 and the (or each) interior chamber 30 formed with the seal body 26. Thus, in use, when the seal body 26 is installed onto a ballscrew assembly so that the inner surface 24 seals against the ballscrew shaft 10, lubricant material may be transferred between the shaft 10 and the internal chamber(s) 30 of the seal body via the openings 28.

As also shown in FIG. 3, the openings 28 may (each) be shaped so as to help control or direct the flow of lubricant material within the ballscrew assembly. Particularly, the openings 28 may be shaped so that a rotation of the ballscrew shaft 10 relative to the seal body 26 (and ball nut 14) causes lubricant material within the ballscrew assembly to either lift up from the shaft 10 into the internal chamber 30 or to spread out from the internal chamber 30 onto the shaft 10.

Figure 11:
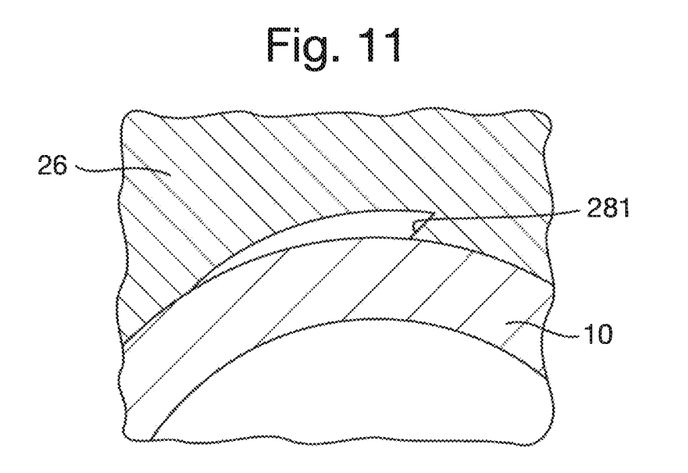
FIG. 11 shows an example of one alternative shape for an opening provided on the inner surface of the seal.

For instance, each (or at least some) of the openings 28 may be shaped to have a first portion 281 that extends substantially radially (e.g. approximately perpendicular to the inner surface of the seal 26 and the thread path of the shaft 10) so that upon rotation of the shaft 10 in a clockwise direction (referring to the configuration shown in FIG. 3, i.e. towards the first portion 281), this first portion 281 acts to lift up or 'scoop' lubricant material and direct the lubricant material towards the internal chamber(s) 30 formed within the seal. Although the first portion 281 as shown in FIG. 3 is approximately perpendicular to inner surface of the seal 26 it will be appreciated that the first portion 281 may suitably take various other shapes that still act in the manner described above to direct lubricant into the internal chamber 30. For instance, it will be appreciated the angle of the first portion 281 relative to the inner surface of the seal 26 need not be strictly perpendicular and may be varied significantly whilst still acting in this manner. For example, FIG. 11 shows an example of a first portion 281 extending at an angle greater than 90 degrees to the inner surface 24 of the seal 26. In other examples, the first portion 281 may be suitably curved or otherwise profiled in order to further enhance the lifting of lubricant material into the internal chamber 30.

The openings 28 may further comprise a second portion 282 that is generally shaped to promote spreading of the lubricant material from the internal chamber(s) 30 onto the shaft 10 upon rotation of the shaft 10 in the anticlockwise direction (i.e. the opposite direction to that described above, towards the second portion 282). For example, as shown in FIG. 3, the second portion 282 of the openings 28 may comprise a relatively extended angled portion that acts to spread lubricant material from the internal chamber 30 onto the ballscrew shaft 10. Thus, the second portion 282 may be generally angled closer to the inner surface 24 of the seal 26 so as to define an acute angle. Again, it will be appreciated that the shape of the second portion 282 may vary from that shown in FIG. 3 whilst still providing the desired function.

Each of the openings 28 may have substantially the same shape. For example, each of the openings 28 may comprise suitably shaped first portions 281 and second portions 282 to allow lubricant material to alternately pass into or out of said internal chamber 30 depending on the direction of rotation. However, in other examples, the inner surface 24 may be provided with a plurality of openings 28 having different shapes. For example, some of the openings 28 may be shaped to promote or allow lubricant material to enter the internal chamber 30 from the inner surface 24 whereas others of the openings 28 may be shaped to promote or allow lubricant material to spread out from the internal chamber 30 onto the inner surface 24. That is, some of the openings 28 may be suitable shaped to substantially only allow fluid to flow in one direction.

Figure 12:
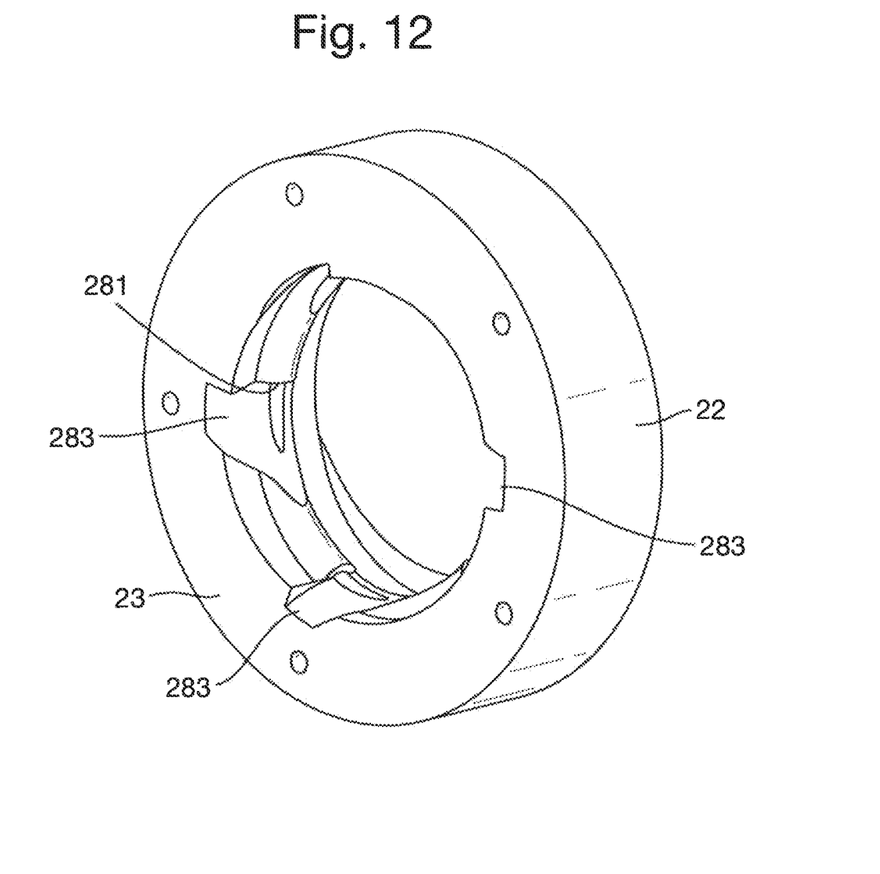
FIG. 12 shows another example of a ballscrew seal according to the present disclosure.

The openings 28 may be disposed entirely within the axial extent of the seal body 26 (i.e. between the radial faces 23, as shown e.g. in FIG. 2) so that the openings 28 generally align with the root of the thread profile of the screw shaft. However, it is also contemplated that the openings 28 may extend over a larger portion of the inner surface 24. Particularly, the openings 28 may include a further cut-out portion 283 extending towards, and opening out into, one of the radial faces 23 of the seal 26. In this way, lubricant material may additionally be channeled from the outer diameter of the screw shaft (i.e. the flat areas of the screw shaft thread profile) into the internal chamber 30 of the seal body. For example, as shown in FIG. 12, the openings 28 provided on the inner surface 24 of the seal body 26 may additionally comprise a third portion 283 in the form of a tapered scarf cut that opens out onto a radial face 23 of the seal body 26 so that lubricant material may also be transferred from the outer diameter of the screw shaft through the cut in the radial face 23 towards the first portion 281 of the opening 28 and hence into the internal chamber 30 of the seal body 26. Particularly, the cut may be provided on a non-exposed part of the seal which is inside the nut 14 when the seal is installed. That is, the cut may be provided on the radial face 23 that faces axially inwardly (towards the second seal) when the seal is installed in the manner shown in FIG. 5.

Figure 4:
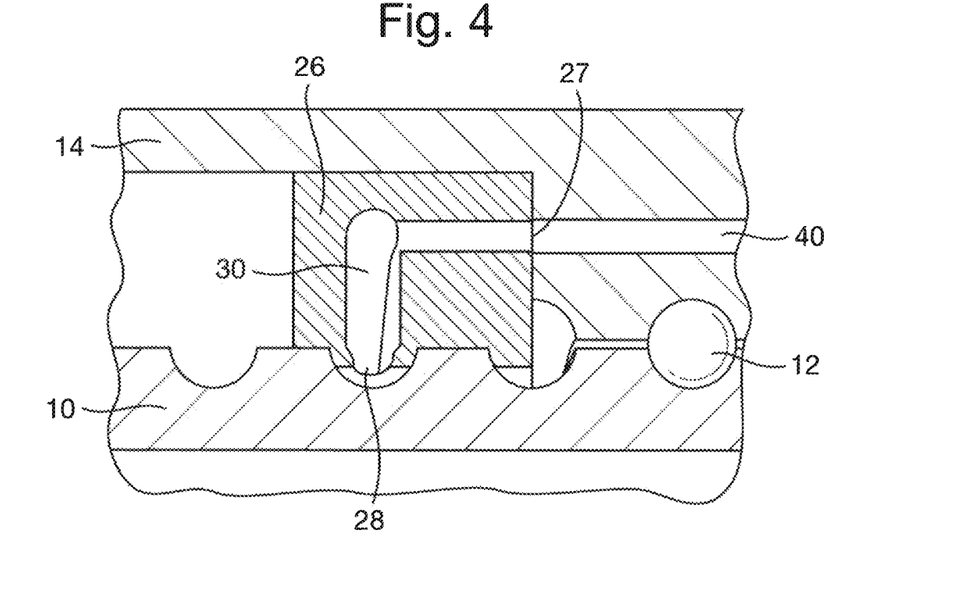
FIG. 4 shows a second sectional view of a seal as depicted in FIG. 2 installed on a ballscrew.

The seal body 26 is also provided with a plurality of external ports 27 which allow lubricant material within the internal chamber 30 to exit the seal 26. The external ports 27 generally act to provide a path for fluid to be transferred out of the internal chamber 30 and away from the inner surface 24 of the seal body. The external ports 27 may thus be provided on a radial face 23 of the seal 26 as shown in FIG. 2. The external ports 27 are arranged so that when the seal 26 is installed within a ballscrew assembly, as shown in FIG. 4, the external ports 27 align with corresponding passages 40 formed within the ball nut 14 (or formed within some other component of the ballscrew assembly).

An exit port 27 may be provided for each opening 28, as shown in FIG. 2. However, in general, the number of external ports 27 may suitably be greater or fewer than the number of openings 28. It will further be appreciated that the external ports 27 may alternatively, or additionally, be provided on the outer (i.e. facing radially outwardly) surface 22 of the seal 26, in which case the passages 40 formed within the ball nut 14 may be re-positioned appropriately in order to align with the external ports 27 in order to define the fluid circulation pathway.

Thus, a pathway may be defined for the lubricant material to flow from the inner surface 24 of the seal body 26, and hence from the surface of the ballscrew shaft 10, through the opening 28 into the internal chamber 30 and then out of the seal body 26 through the external ports 27 into the passages 40 formed within the ball nut 14, or vice versa (i.e. from the passages 40 onto the inner surface 24 of the seal body 26). In this way, the lubricant material may be re-circulated around the ballscrew assembly via the internal chamber(s)

30 of the seal body 26. Thus, the lubricant material may be re-directed using the openings 28 of the seal body 26 and re-circulated through the ball nut 14.

Figure 5:
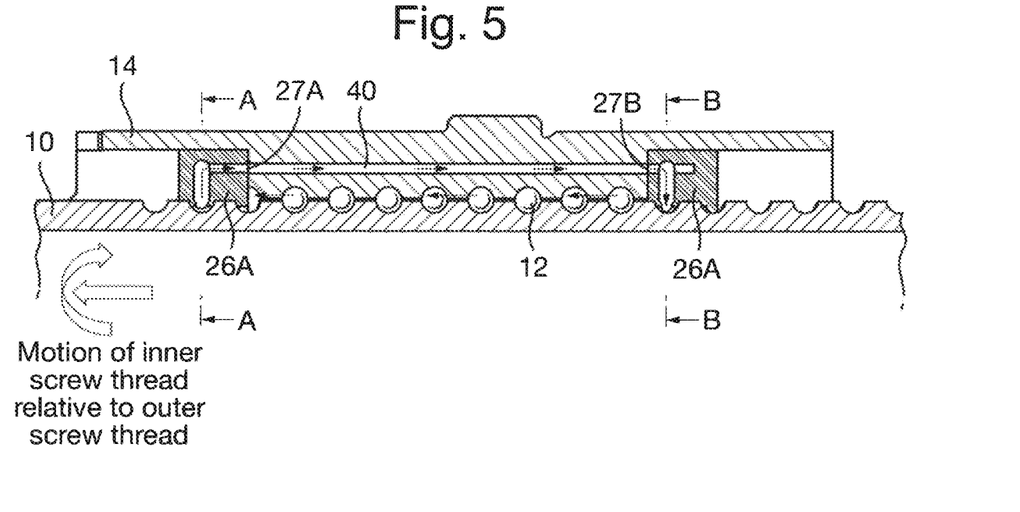
FIG. 5 shows a sectional view of a ballscrew sealing assembly according to an example of the present disclosure incorporating two seals substantially of the type shown in FIG. 2 arranged to provide an internal re-circulating path for the lubricant material.

For instance, FIG. 5 shows a complete ballscrew assembly comprising a first seal 26A and a second seal 26B each of the type substantially described above. As shown, the first seal 26A and the second seal 26B are installed at opposite ends of the ballscrew assembly, with their respective external ports 27A, 27B facing towards each other, and each aligned with a corresponding passage 40 in the ball nut 14, so as to define a complete re-circulating pathway within the ballscrew assembly. Thus, when the ballscrew assembly is substantially filled with lubricant material, the lubricant material tends to follow the relatively lower resistance path offered by the re-circulating pathway.

Figure 6:
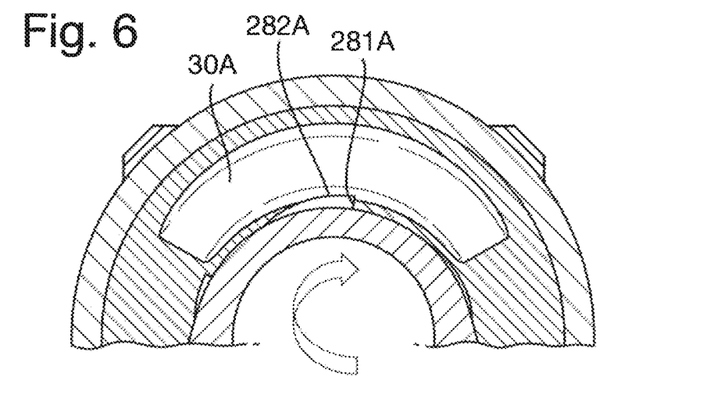
FIG. 6 shows a sectional view taken across one of the seals shown in FIG. 5.
Figure 7:
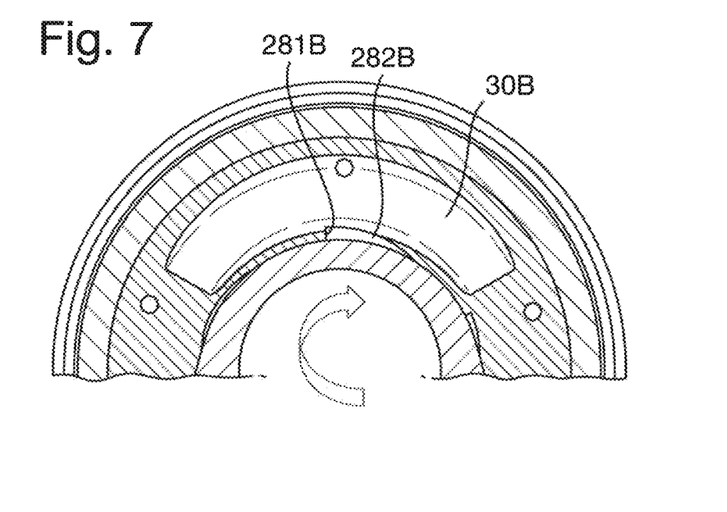
FIG. 7 shows a sectional view taken across the other of the seals shown in FIG. 5.

FIGS. 6 and 7 show respective cross-sections of the first seal 26A and the second seal 26B taken along the lines A-A and B-B. As shown, the first seal 26A and the second seal 26B are installed in the opposite sense so that rotation of the shaft 10 in a first direction causes lubricant material to flow into the internal chamber of one of the seals and out of the internal chamber of the other of the seals, whereas rotation of the shaft 10 in a second, opposite direction causes the flow of lubricant material to be reversed.

That is, as shown, the first portion 281A of the first seal 28A is arranged on the opposite side as the first portion 281B of the second seal 28B. Thus, upon rotation of the shaft 10 in the clockwise direction (referring to FIGS. 5, 6 and 7), lubricant material is caused to lift up and enter the internal chamber 30A of the first seal 26A installed at the first end of the ballscrew assembly. The lubricant material is then transferred from the internal chamber 30A of the first seal 26A out of the external port(s) 27A and into the corresponding passage(s) 40 formed within the ball nut 14, and caused to flow into the internal chamber 30B of the second seal 26B installed at the second end of the ballscrew assembly. The lubricant fluid is then caused to spread out from the second portion 282B of the second seal 26B onto the shaft 10, wherein the lubricant fluid then migrates along the shaft 10 back towards the first seal 26A wherein upon further rotation in the clockwise direction it is re-circulated around the ballscrew assembly.

Similarly, rotation of the shaft 10 in the opposite i.e. anticlockwise direction reverses the direction of the lubricant material flow around the ballscrew assembly.

Thus, the routing provided by the openings, internal chambers and passages within the ballscrew assembly may offer a re-circulating path of relatively lower resistance for the lubricating material. So, instead of simply trying to prevent lubricant material escaping from the ends of the ballscrew assembly by fighting the natural migration of the lubricant material (e.g. by simply providing a labyrinth seal, as in FIG. 1), a seal according to the present disclosure may act to exploit the natural migration of the lubricant material due to the rotation of the shaft 10 to re-direct and re-circulate the lubricant material within the ballscrew assembly in order to further limit the escape of the lubricant material. Particularly, it will be appreciated that the re-circulating pathway defined between the two seals 26A, 26B offers a path of lower resistance for the lubricant material so that re-circulation of the lubricant material around the ballscrew assembly may be promoted (e.g. over other pathways where the lubricant material is lost). The ballscrew assemblies presented herein may thus provide improved containment of the lubricant material, allowing for longer maintenance intervals.

The system may generally be filled with lubricant material so that rotation of the shaft 10 drives the lubricant material around the ballscrew assembly along the path of relatively low resistance offered by the re-circulating pathway. This motion may be driven solely by the fluid pressures and the stresses introduced by the shaping of the openings 28. However, it is also contemplated that by appropriately configuring the relative dimensions of, or by suitably tapering any of, the external ports 27 of the seals 26 and the passages 40 within the ball nut, etc., various pressure differentials may be established within the ballscrew assembly to further facilitate the flow of lubricant material around the ballscrew system. Furthermore, although FIG. 5 shows a passage 40 extending substantially directly between the first seal 26A and the second seal 26B, it will be appreciated that the passage(s) 40 formed within the ball nut 14 may define passages of various suitable forms, such as helical or tortuous passages through the ball nut 14.

Although FIG. 5 shows a single re-circulating path defined between a first seal 26A and a second seal 26B provided at the ends of the ballscrew assembly, it will be appreciated that in principle additional seals may be provided within the ballscrew assembly to define multiple re-circulating paths within the ballscrew assembly.

Also, although not shown in FIG. 1, some existing ballscrew sealing technologies utilise energisers (e.g. springs) within the seal design that act to squeeze the seal thread profile onto the screw shaft thread to try and provide an improved seal. For example, such an arrangement is described in U.S. Pat. No. 9,388,890 (TRELLEBORG SEALING SOLUTIONS US, Inc.). The seals and screw assemblies presented herein may also include such energisers. However, this arrangement may result in increased seal drag forces, and thus a deterioration in ballscrew performance. Further, the seals presented herein may provide improved sealing performance without requiring such energisers. Thus, according to some examples, the seals and screw assemblies of the present disclosure are not provided with such energisers and may thus offer reduced seal drag forces and further improved ballscrew performance compared to those described in U.S. Pat. No. 9,388,890.

The seals described herein may be formed from various suitable sealing materials. Typically, the seals may be formed using hard plastics, such as a hard PTFE plastic.

Figure 8:
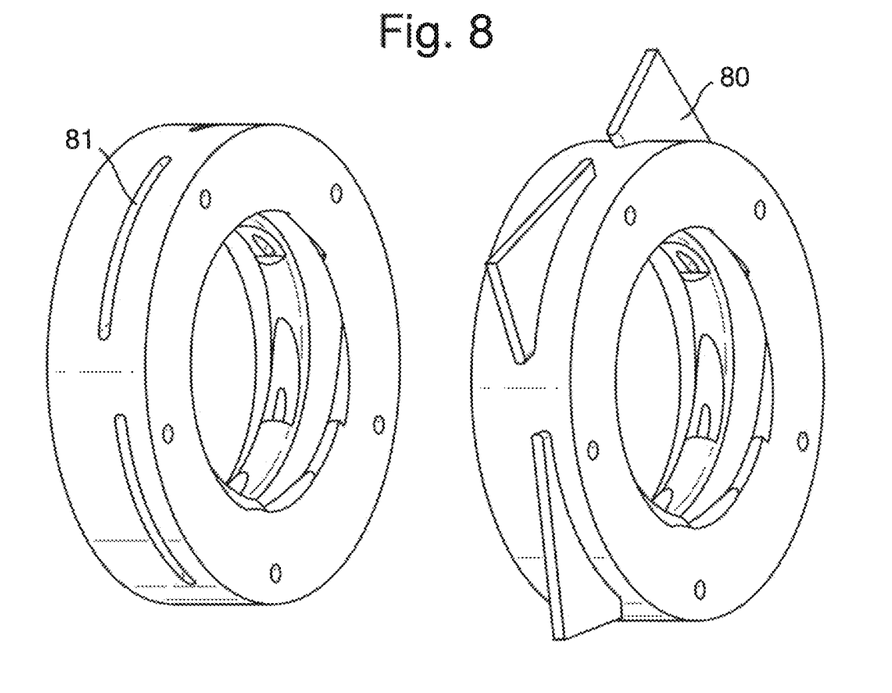
FIG. 8 illustrates how a seal of the type shown in FIG. 2 may be formed by a moulding process using removable inserts.
Figure 9:
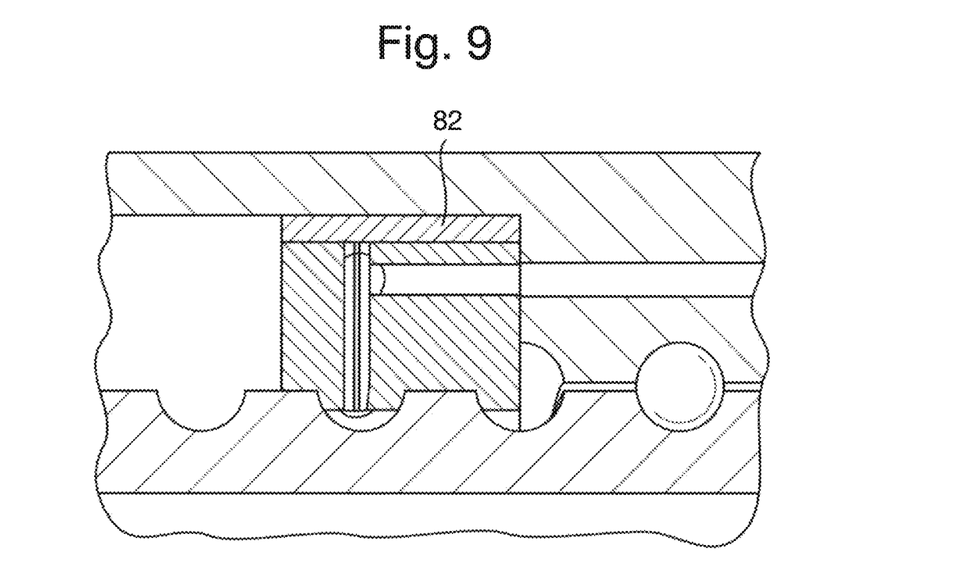
FIG. 9 shows an example of a seal formed according to a moulding process having a solid cap provided thereon.

It is envisioned that a seal of the type generally shown in FIG. 2 may be manufactured using soluble core technology. However, it will be appreciated that such seals may also be formed by moulding. For instance, FIG. 8 illustrates how the seal may be formed by moulding utilising a number of removable tooling inserts 80. In this case, a corresponding number of recesses 81 are formed on the radially outer surface of the moulded seal. As shown in FIG. 9, a two-piece seal may thus be provided having a hard cap 82 disposed on the seal body to provide robust containment of lubricant at the external surface of the seal.

Although the techniques presented herein have been described with reference to particular embodiments, it will be understood by those skilled in the art that various changes in form and detail may be made without departing from the scope of the invention as set forth in the accompanying claims.

For instance, although an embodiment has been described above by way of example with particular reference to a ballscrew assembly, it will be appreciated that the seals and techniques presented herein may also suitably be applied to various other screw assemblies where it is generally desirable to better contain the lubricant material within the screw assembly e.g. due to the operating environment or for reasons of size and weight. Particularly, it is contemplated that the seals and techniques presented herein may also suitably be applied to other roller screw or lead screw-type assemblies comprising a threaded screw shaft. For example, the seals presented herein may also be used to provide improved lubrication for 'ACME'-type lead screw actuator assemblies.

The invention claimed is:

1. A screw assembly comprising:
   a screw shaft having a helical thread profile; and
   a nut for mounting around said screw shaft;
   the screw assembly further comprising a first seal and a second seal, wherein each of said first seal and said second seal independently comprises a seal, the seal comprising:
   a seal body having an inner surface for mounting onto and sealing against a screw shaft;
   an internal chamber formed within said seal body, wherein one or more openings are provided on said inner surface to allow lubricant material to transfer between said inner surface and said internal chamber; and one or more external ports provided on a radial surface and/or an outer surface of said seal body for transferring lubricant material into or out of said internal chamber of said seal body;
   wherein respective external ports (27A, 27B) of said first and second seals (26A, 26B) are aligned with respective passages extending through said screw assembly to provide a re-circulating path for re-circulating lubricant material within said screw assembly.

2. The screw assembly of claim 1, wherein said passages are formed within said nut such that said re-circulating path extends from the first seal (26A) through the passage formed within the nut to the second seal.

3. The screw assembly of claim 1, wherein said first seal (26A) is disposed at a first end of said screw assembly and wherein said second seal (26B) is disposed at a second, opposite end of said screw assembly.

4. The screw assembly of claim 1, wherein a rotation of said screw shaft relative to the first and second seals in a clockwise direction causes lubricant material to flow around said re-circulating path in a first direction and wherein rotation of said screw shaft relative to the first and second seals in an anti-clockwise direction causes lubricant material to flow around said re-circulating path in a second, opposite direction.

5. The screw assembly of claim 1, wherein said screw assembly is a ballscrew assembly comprising a plurality of ball bearings received within the thread profile of said screw shaft and wherein said nut radially confines said ball bearings within the ballscrew assembly.

6. An aircraft comprising: the screw assembly of claim 1.

7. An aircraft control system comprising: the screw assembly of claim 1.

* * * * *